United States Patent
Hotra et al.

(10) Patent No.: US 9,323,576 B2
(45) Date of Patent: Apr. 26, 2016

(54) REMOVAL OF IDLE TIME IN VIRTUAL MACHINE OPERATION

(71) Applicant: The Boeing Company, Seal Beach, CA (US)

(72) Inventors: Jonathan N. Hotra, St. Louis, MO (US); Jerry A. Esrig, St. Louis, MO (US)

(73) Assignee: The Boeing Company, Chicago, IL (US)

(*) Notice: Subject to any disclaimer, the term of this patent is extended or adjusted under 35 U.S.C. 154(b) by 100 days.

(21) Appl. No.: 14/172,206

(22) Filed: Feb. 4, 2014

(65) Prior Publication Data
US 2015/0220367 A1    Aug. 6, 2015

(51) Int. Cl.
*G06F 9/455*    (2006.01)
*G06F 9/50*    (2006.01)
*G06F 9/48*    (2006.01)

(52) U.S. Cl.
CPC .......... *G06F 9/5038* (2013.01); *G06F 9/45533* (2013.01); *G06F 9/45558* (2013.01); *G06F 9/4825* (2013.01); *G06F 9/4887* (2013.01); *G06F 2009/4557* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 7,475,002 B1 | 1/2009 | Mann | |
| 2009/0112569 A1 | 4/2009 | Angus et al. | |
| 2009/0241112 A1* | 9/2009 | Shimogawa | 718/1 |
| 2009/0260006 A1 | 10/2009 | Hotra | |
| 2010/0138208 A1* | 6/2010 | Hattori et al. | 703/25 |
| 2010/0251235 A1* | 9/2010 | Ganguly et al. | 718/1 |
| 2012/0060168 A1 | 3/2012 | Lee et al. | |
| 2012/0174098 A1* | 7/2012 | Tanikawa et al. | 718/1 |
| 2013/0007730 A1 | 1/2013 | Hotra et al. | |
| 2013/0031543 A1 | 1/2013 | Angus | |
| 2013/0218549 A1 | 8/2013 | Sultan et al. | |

FOREIGN PATENT DOCUMENTS

WO    WO 01/75602    10/2001

OTHER PUBLICATIONS

Dong Jin et al.; *Virtual Time Integration of Emulation and Parallel Simulation*; ACM/IEEE/SCS 26th Workshop on Principles of Advanced and Distributed Simulation; 2012; pp. 201-210.
International Search Report and Written Opinion of the International Searching Authority for corresponding International Application No. PCT/US2014/064618 mailed Feb. 19, 2015.
"Timekeeping in VMware Virtual Machines," Copyright 1998-2005, VMware White Paper, 25 pages.
"Timekeeping in VMware Virtual Machines," Copyright 2011, VMware Information Guide, 32 pages.

* cited by examiner

*Primary Examiner* — Kenneth Tang
(74) *Attorney, Agent, or Firm* — Womble Carlyle Sandridge & Rice LLP

(57) ABSTRACT

A computer system for providing virtualization services may execute computer programs by a virtual processor in a virtual machine. The computer programs may be executed as tasks scheduled for execution at respective points in an apparent time tracked by an apparent-time reference. During execution of the computer programs, the computer system may detect a current point in apparent time at which all tasks scheduled for repeated execution at a given frequency have been executed, or at which the virtual processor is idle. And in response, the computer system may advance the apparent time to a subsequent point with a frequency greater than that with which the apparent time is tracked by the apparent-time reference.

15 Claims, 5 Drawing Sheets

REMOVAL OF IDLE TIME IN VIRTUAL MACHINE OPERATION

TECHNOLOGICAL FIELD

The present disclosure relates generally to virtualization of hardware and, in particular, to removal of idle time in a virtual machine or virtualization platform provided thereby.

BACKGROUND

Many modern complex systems including aircraft, spacecraft, automobiles, medical devices and the like involve a central computer system or other processing element that communicates with a number of subsystems to create a complete system. This central processing element may include one or more processors and/or cores that execute computer programs designed to control the complex system.

To develop these complex systems, test facilities are created that allow for computer programs in the central computer system to be developed and tested with real and/or simulated subsystems attached to the test facilities. Since these test facilities are often expensive, they are typically a limited resource on a development program. To create more test capabilities, virtual representations of the test facilities are often created.

One way to create a virtual test facility is to create simulations of appropriate devices and communication interfaces and attach these simulations to computer programs for control of the complex system that run inside a virtualization platform, which may be provided by a suitable virtual machine configured to run on top of a host hardware platform. It is often desirable to run computer programs on an emulated processor inside the virtual platform. The emulated processor and virtualization layer allows for great control of the execution of the computer programs, and it also provides greater visibility into the operation of the computer programs.

After a complex system is developed, it is often necessary or highly desirable to create a trainer to train the users of the complex system on its operation. It is highly desirable to have a trainer that operates in a fashion as close to, if not identical, to the operation of the actual system. One method to create a trainer is to run computer programs inside a virtualization platform on a host hardware platform. It is often desirable to run the computer programs on an emulated processor inside the virtual platform. The emulated processor and virtualization layer provides a high fidelity representation of the actual system and allows for great control of the execution of the computer programs to allow for the creation of certain training scenarios that would not be possible on the actual target hardware platform used in the complex system.

The creation of a virtualization platform involves the creation of a pure software representation of the target hardware platform found on the actual complex system. The objective of the virtualization is to make the computer programs running inside the virtual platform to execute in a similar fashion as the real target hardware. To accomplish this goal, the hardware found in the memory map of a system that is accessed by the computer programs running on the virtual platform may be virtualized. This virtualization of the hardware varies in complexity, but if done correctly when computer programs read/write to memory locations and registers, it should see the behavior it expects in the system.

Another aspect of creating a virtualization platform is the correct handling of interrupts in a system. The interrupts are used to signal events in a system, such as input/output transmission and/or reception, timer expiration and the like. The design of the interrupts varies between systems. Interrupt designs often use interrupt lines, vectors and controllers to attach the interrupts to devices in a system. All of the functionality of the interrupt design may be virtualized to achieve an effective virtual platform.

Emulation of a processor is often a desirable feature in a virtualization platform. The processor emulation allows for the exact same binaries of the computer programs that execute on the hardware to execute in the virtualization platform. It is also possible to use the exact same software development environment and operating systems if processor emulation is available on the virtualization platform.

Emulation of a processor is slower than native processor execution. It is often desirable in test facilities and trainers that use virtualization platforms to run at least as fast as the target hardware platform being virtualized, and it is often desirable to run accelerated (faster than the target hardware platform). Since the host hardware platform that runs the virtualization platform is typically much faster than the target hardware platform, the necessary performance can sometimes be achieved without additional work. But as the performance gap closes between the target and host hardware platforms, it may be difficult if not impossible to achieve the desired emulation performance using traditional techniques.

BRIEF SUMMARY

Computer programs typically use less than all of the processing resources on a system. There is usually at least some portion of the available processing resources that at least some of the time is spent in an idle task or doing no useful processing other than waiting for an event to occur. Idle time often includes this time, and example implementations of the present disclosure are generally directed to its removal in virtual machine operation. This may be particularly useful in a number of contexts, such as to realize considerable performance gains in virtualization with processor emulation. And it may particularly benefit the creation of test facilities and trainers for complex systems such as aircraft, spacecraft, automobiles, medical devices and the like.

According to one aspect, a computer system is provided that includes a processor and a memory that stores computer-readable program code portions that, in response to execution by the processor, cause the computer system to perform a number of operations. In this regard, the computer system may be caused to execute one or more computer programs by at least one virtual processor in a virtual machine. The computer programs may be executed as tasks scheduled for execution at respective points in an apparent time tracked by an apparent-time reference such as a virtual timer.

In some examples, the virtual machine may be defined to provide a virtualization platform for virtualization of a target hardware platform including a processor of a type different from the processor of the computer system. In these examples, the virtualization platform including the virtual processor may be configured to execute the computer programs through emulation of the processor of the target hardware platform.

During execution of the computer programs, then, the computer system may be caused to detect a current point in apparent time during any particular frame at which all tasks scheduled for repeated execution at a given frequency have been executed, or at which the virtual processor is idle. And in response, the computer system may be caused to advance the apparent time from the current point to a subsequent point with a frequency greater than that with which the apparent time is tracked by the apparent-time reference.

In some examples, the computer programs may be executed as tasks during a cycle divided into a plurality of frames in one or more of which each of at least some of the tasks is scheduled for execution, with the frames having boundaries defined at respective points in the apparent time. In these examples, the computer system being caused to detect the current point in apparent time may include being caused to detect the current point in apparent time during any particular frame.

In some examples, the subsequent point in apparent time may define the boundary of a frame immediately following the particular frame in the cycle.

In some examples in which an idle virtual processor is detected, the computer system may be caused to incrementally advance the apparent time in portions of a duration of each of the frames until the earlier of the subsequent point in apparent time that defines the boundary of a frame immediately following the particular frame in the cycle is encountered, or the subsequent point in apparent time at which a task is scheduled for execution is encountered.

In some examples, the subsequent point in apparent time may be the point in apparent time that defines the boundary of a frame immediately following the particular frame in the cycle, less a processing window of a given duration of the particular frame. In some further examples, during execution of the computer programs, the computer system may be further caused to detect a current point in apparent time during the processing window at which all tasks scheduled for repeated execution at a given frequency have been executed, or at which the virtual processor is idle. And in response, the computer system may be caused to advance the apparent time from the current point to the subsequent point in apparent time that defines the boundary of the frame immediately following the particular frame in the cycle.

In some examples, the apparent-time reference may be configured to virtualize a corresponding time reference (e.g., timer) of a target hardware platform, and the tasks may be generated in response to events known to occur at respective points in apparent time. These events may include events that occur at the respective points in apparent time at which the boundaries of the frames are defined. In these examples, the computer system being caused to detect the current point may include being caused to detect the current point in apparent time at which the virtual processor is idle. And the computer system being caused to advance the apparent time may include being caused to advance the apparent time to a next subsequent point in apparent time at which an event of the events is known to occur.

In other aspects of example implementations, a method and computer-readable storage medium are provided for removal of idle time in virtual machine operation. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
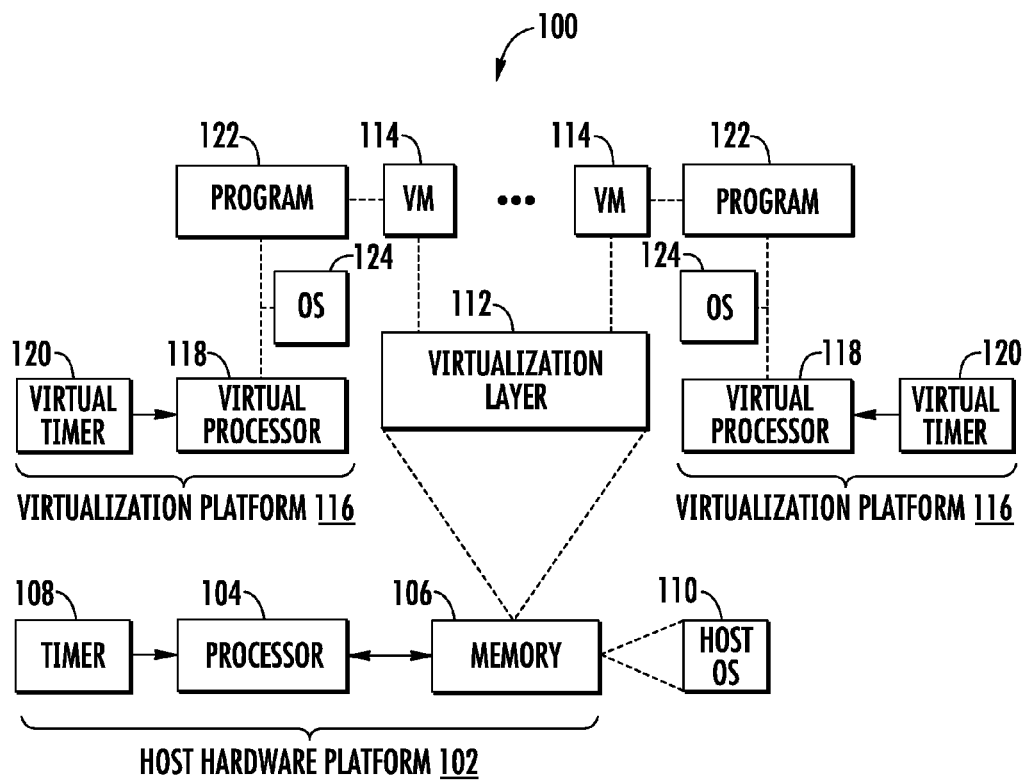
FIG. 1 illustrates a computer system in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure are directed to removal of idle time in operation of a virtual machine on a host hardware platform. Example implementations of the present disclosure may be implemented by various means including hardware, alone or under direction of one or more computer program code instructions, program instructions or executable computer-readable program code instructions (at times generally referred to as "computer programs," "software," "firmware" or the like) from a computer-readable storage medium. FIG. 1 illustrates a computer system 100 that may be configured to implement various example implementations of the present disclosure.

The computer system 100 may comprise, include or be embodied in one or more fixed or portable electronic devices. Examples of suitable electronic devices include a smartphone, tablet computer, laptop computer, desktop computer, workstation computer, server computer or the like. As shown, the computer system may include a host hardware platform 102 with one or more of each of a number of components such as, for example, a processor 104 (e.g., processor unit) connected to a memory 106 (e.g., memory device, persistent storage).

The processor 104 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another computer system or apparatus).

The processor 104 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 106 is generally any piece of computer hardware that is capable of storing information such as, for example, data, computer programs (e.g., computer-readable program code) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

The computer system 100 may also include or otherwise support one or more time references configured to measure time intervals or otherwise track time. As shown and primarily described herein, one example of a suitable time reference is a timer 108. It should be understood, however, that the computer system may additionally or alternatively include other suitable types of time references, and that example implementations may be equally applicable to these other types of time references. Examples of other suitable time references include processor counters such as time stamp counters (TSCs), timebase counters, incrementing and/or decrementing counters, and the like.

In some examples, a time reference such as a timer 108 may be configured to measure the passage of time such as by tick counting or tickless timekeeping. In accordance with tick counting, the timer may be configured to periodically generate a timer interrupt (also known as a "tick") at a known rate such as 100 times per second. Tickless timekeeping may include the timer being configured to keep a count of a number of time units that have passed since some event such as the computer system 100 boot. Even further, in some examples, the timer may be configured to track real time, also known as "wall-clock time." Examples of suitable timers include programmable interval timers (PITs), real-time clocks (RTCs), local advanced programmable interrupt controller (APIC) timers, advanced configuration and power interface (ACPI) or chipset timers, time stamp counters (TSCs), high-precision even timers (HPETs) or the like.

The memory 106 may store computer programs or software that, when loaded into and executed by the processor 104, cause the computer system 100 or more particularly its host hardware platform 102 to provide virtualization services. This software may include, for example, a host operating system (OS) 110 configured to manage the host hardware platform. In addition, this software may include a virtualization layer 112 configured to serve as a software layer above the host hardware platform. The virtualization layer may be integrated within or run on top of the host OS. The virtualization layer may operate one or more virtual machines (VMs) 114.

The term "virtualization" as used herein may refer to techniques for hiding or separating the details or physical characteristics of computing resources from the way in which other systems, applications, or end users interact with those resources. Different aspects of virtualization may include presenting a single physical resource as multiple logical resources. Other aspects of virtualization may include presenting multiple physical resources as a single logical resource.

Each VM 114 may be defined to provide a virtualization platform 116 for virtualization of a target hardware platform. The term "virtualization platform" is typically associated with an embedded system, but such platforms are really just a type of the more general term virtual machine. Both virtual platforms and virtual machines are virtual representations of hardware.

The virtualization platform 116 may include one or more of each of a number of virtual components such as, for example, a virtual processor 118 configured to virtualize a processor of the target hardware platform, and an apparent-time reference configured to virtualize a corresponding time reference (e.g., timer) of the target hardware platform. As shown and primarily described herein, one example of a suitable apparent-time reference is a virtual timer 120, although it should be understood that the virtualization platform may additionally or alternatively include (and example implementations may be equally applicable to) other suitable types of apparent-time references, similar to the above with respect to the timer 108 of the computer system 100.

As also shown, the virtual processor 118 may be configured to execute one or more computer programs 122, such as in an OS 124. Similar to the host OS 110 running on the host hardware platform 102, the OS running on the VM 114 may be configured to manage the target hardware platform virtualized by the virtualization platform 116.

The target hardware platform (including its processor and timer) virtualized by the virtualization platform 116 (including its virtual processor 118 and timer 120) may be the same or different from the host hardware platform 102 (including its processor 104 and timer 108). Similarly, the OS 124 running on the VM 114 may be the same or different from the host OS 110. In instances in which the target and host hardware platforms differ, the virtualization platform may be configured to emulate the target hardware platform. More specifically, in these instances, the virtual processor and timer of the virtualization platform may be configured to emulate those of the target hardware platform. For example, the virtual processor may be configured to execute computer programs 122 through emulation of the processor of the target hardware platform.

An apparent-time reference such as a virtual timer 120 may be configured to virtualize or otherwise emulate a corresponding time reference (e.g., timer) of the target hardware platform. Whereas timers of hardware platforms such as the timer 108 of the host hardware platform may track real (or wall-clock) time, though, the virtual timer may track an apparent time (sometimes called virtual time but not to be confused with logical time). This apparent time represents the time visible to the VM 114, The virtual timer 120 may track apparent time similar to the timer of the host hardware platform, but the virtual timer's frequency is not dependent on that of the timer of the host hardware platform. Thus, the apparent time tracked by the virtual timer need not exactly follow real time. And in some examples, apparent time may be controlled to advance forward or backward, faster or slower, or even stop.

In accordance with example implementations of the present disclosure, the computer programs 122 may be executed by the virtual processor 118 as tasks scheduled for execution at respective points in an apparent time tracked by an apparent time reference (e.g., virtual timer 120). In some examples, the virtualization platform 116 may virtualize a frame-based system in which the tasks may be executed during a cycle or multiple, repeatable cycles in which the tasks are scheduled for execution.

Figure 2:
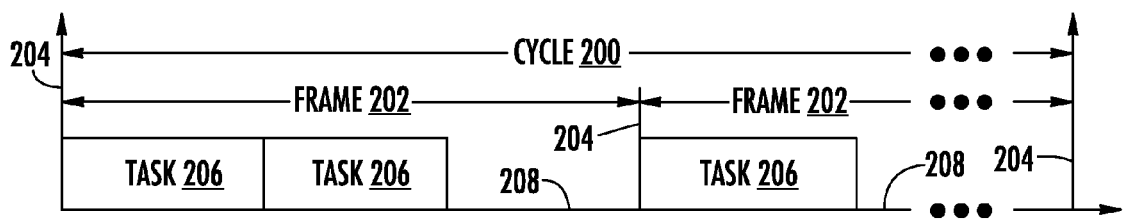
FIG. 2 illustrates a cycle including frames in which tasks may be executed in a virtual machine, according to some example implementations of the present disclosure.

FIG. 2 illustrates a cycle 200 according to some examples. As shown, a cycle may be divided into a plurality of minor cycles often referred to as frames 202 (or sometimes minor frames). The frames may have boundaries 204 defined at respective points in apparent time tracked by an apparent-time reference (e.g., virtual timer 120) of the virtualization platform 116. Although shown and described herein in the context of a frame-based system, it should be understood that example implementations may equally apply to non-frame-based systems, such as those that are purely event-driven.

As also shown in FIG. 2, each of at least some of the tasks 206 of the computer programs may be scheduled in one or more of these frames. The tasks shown may include those scheduled for repeated execution at a given frequency. These tasks are sometimes referred to as foreground tasks, and often include higher-priority tasks. In the context of a complex system such as an aircraft, foreground tasks may include those that insure control of the aircraft. The time between these tasks during any particular frame is sometimes referred to as the background 208. Other tasks may be executed in the background, or at times the virtual processor 118 may be idle (sometimes represented by an idle state or idle task of the virtual processor). Tasks executed in the background often include lower-priority tasks, such as those used for application software and OS housekeeping functionality (e.g., updating flash memory). Some more particular example of a task executed in the background may be the aforementioned idle task representing an idle virtual processor, or a spin loop that may be used to simply generate an arbitrary time delay. In the context of a complex system, these background tasks often do not include those that are critical to control of the complex system.

In accordance with example implementations of the present disclosure, during execution of computer programs 122 by the virtual processor 118, the VM 114 one of its components (e.g., the virtual processor) may detect a current point in apparent time during any particular frame 202 at which all tasks 206 scheduled for repeated execution at a given frequency (foreground tasks) have been executed, or at which the virtual processor is idle (e.g., in the background 208). And in response, the apparent time tracked by virtual timer 120 may be advanced from the current point to a subsequent point with a frequency greater than that with which the apparent time is tracked by the virtual timer. In some examples, the virtual timer may itself advance apparent time. In other examples, the VM or one or more of its other components may cause the virtual timer to advance apparent time.

The point in apparent time at which all foreground tasks 206 have been executed may be detected in any of a number of different manners. For example, a particular hardware activity or a particular sequence of hardware activity of the target hardware platform 102 may indicate the end execution of the foreground tasks (or near the beginning of the background 208). In another example, computer programs 122 on the VM 114 may be designed or modified to cause a detectable event (e.g., by the VM) that may indicate the end of the foreground tasks in a frame 202. These events may include, for example, special assembly instructions, a read/write to a specific memory location, hardware accesses to real or fake hardware locations or the like.

In another example, the point in apparent time at which all foreground tasks 206 have been executed may be detected through analysis of the binaries of the computer programs 122 for the last instruction of the foreground tasks. And in yet another example, the binaries may be analyzed for the first instruction in the background 208, which may indicate the end of the foreground tasks, and in turn the beginning of the background.

The point in apparent time at which the virtual processor 118 is idle (e.g., in the background 208) may be detected in any of a number of different manners. For example, a particular hardware activity or a particular sequence of hardware activity of the target hardware platform 102 virtualized by the VM 114 may indicate an idle state of the virtual processor. In another example, the computer programs 122 on the VM may be modified to include a new lowest priority task to set a memory location or hardware device (e.g., discrete) to indicate that the frame is idle. In yet another example, the kernel symbol table of the OS 124 or binaries of the computer programs may be statically or dynamically analyzed for idle task instructions at load time. The VM may then monitor the executed instructions to identify when the idle task instructions are executed, which may indicate that the virtual processor is idle. At this point, in some examples, the VM may call a handler to advance the current point in apparent time.

The subsequent point in apparent time to which the current point is advanced may vary in accordance with any of a number of different techniques. In a first example approach, the subsequent point to which the current point in apparent time is advanced may define the boundary 204 of a frame 202 immediately following the particular frame in which it has been detected that all foreground tasks have been executed, or the virtual processor 118 is idle.

A more particular example of the first approach may include an initialization in which the duration of a frame 202 may be calculated (e.g., $Time_{Frame}=1/Frame\ Rate$). During any particular frame, then, apparent time may be advanced such as in accordance with the foregoing:

a. Read the apparent time at the start of a particular frame ($Time_{Frame\_Start}$);
 b. Read the current point in apparent time at which the end of foreground tasks or an idle virtual processor 118 is detected ($Time_{Current}$);
 c. Calculate the time remaining in the particular frame ($Time_{Remaining\_in\_Frame}=Time_{Frame}-(Time_{Current}-Time_{Frame\_start})$); and
 d. Advance apparent time to the subsequent point ($Time_{Subsequent}=Time_{Current}+Time_{Remaining\_in\_Frame}$).

In a second example approach, when the virtual processor 118 is idle at the detected current point in apparent time, the apparent time may be incrementally advanced. That is, the apparent time may be incrementally advanced in portions of the duration of each of the frames 202 (e.g., $Time_{Frame}$) until the earlier of the subsequent point in apparent time that defines the boundary 204 of a frame immediately following the particular frame, or the subsequent point in apparent time at which a task is scheduled for execution. This approach may be particularly beneficial in instances in which the computer programs 122 may be intolerable of sudden changes in apparent time.

A more particular example of the second approach may include an initialization similar to the first example approach where the duration of a frame 202 may be calculated (e.g., $Time_{Frame}$). During this initialization, the second approach may further include calculation of an apparent time increment, such as by dividing the duration of the frame by some arbitrary number of parts (e.g., Time_Increment=Time$_{Frame}$/100). During any particular frame, apparent time may be advanced such as in accordance with the foregoing:

a. Read the current point in apparent time at which an idle virtual processor 118 is detected (Time$_{Current}$);
    b. Advance apparent time to the subsequent point (Time$_{Subsequent}$=Time$_{Current}$+Time_Increment);
    c. Incrementally repeat the advance of time (b.) until the earlier of the subsequent point in apparent time that defines the boundary 204 of a frame immediately following the particular frame, which may be marked by a start of frame or interrupt of the virtual timer 120 (or virtual timer interrupt), or the subsequent point in apparent time at which a task (foreground or background—except for perhaps an idle task) is scheduled for execution.

In a third example approach, the subsequent point in apparent time may be the point in apparent time that defines the boundary 204 of a frame 202 immediately following the particular frame, less a processing window of a given duration of the particular frame. In some further examples, the VM 114 one of its components (e.g., the virtual processor) may further detect a current point in apparent time during the processing window at which all foreground tasks have been executed, or the virtual processor 118 is idle. And in response, the apparent time may be further advanced from the current point to the subsequent point in apparent time that defines the aforementioned boundary 204 (formerly less the processing window).

A more particular example of the third approach may include an initialization in which the duration of a frame 202 may be calculated (e.g., Time$_{Frame}$), as may a processing window (Time$_{Processing\_Window}$). Similar to the time increment of the second example approach, the processing window in some examples may be calculated by dividing the duration of the frame by some arbitrary number of parts (e.g., Time$_{Processing\_Window}$=Time$_{Frame}$/100). During any particular frame, apparent time may be advanced such as in accordance with the foregoing:

a. Read the apparent time at the start of a particular frame (Time$_{Frame\_Start}$);
    b. Read the current point in apparent time at which the end of foreground tasks or an idle virtual processor 118 is detected (Time$_{Current}$);
    c. Calculate the time remaining in the particular frame (Time$_{Remaining\_in\_Frame}$=Time$_{Frame}$−(Time$_{Current}$−Time$_{Frame\_Start}$)); and
    d. Advance apparent time to the subsequent point (Time$_{Subsequent}$=Time$_{Current}$+Time$_{Remaining\_in\_Frame}$−Time$_{Processing\_Window}$).

In accordance with the third example approach, the processing window may be an arbitrary window that gives spare processing for other tasks, such as lower-priority tasks. In some examples, the processing window may be analytically calculated from the code. This spare processing may be static and always the same for each frame 202, or it may be dynamically sized for each frame based on some pertinent parameter, such as lower priority task execution time or hardware activity. There may be some idle time in the above approach because the processing window may not be entirely utilized. As more generally described above, a further variant on this third example approach that may remove the this idle time may include detecting, during the processing window, a current point in apparent time at which all foreground tasks have been executed, or the virtual processor 118 is idle, and then jump to the next frame, such as in a manner similar to the first example approach.

In yet another, fourth example approach, tasks may be generated in response to events known to occur at respective points in apparent time, and the events may include interrupts of the virtual timer 120 that occur at the respective points in apparent time at which the boundaries 204 of the frames 202 are defined. In examples in which the virtual processor 118 is idle at the detected current point in apparent time, the apparent time may be advanced to a next subsequent point in apparent time at which a next event of upcoming ones of the events is known to occur.

A more particular example of the fourth approach may include during any particular frame 202, detecting a current point in apparent time at which the virtual processor 118 is idle. Events may be registered with the virtual timer 120 or one or more other timers of the VM 114. These events may be analyzed, and apparent time advanced to the next event occurring after the detected current point. Eventually, in the event a frame does not include any idle virtual processor time, the start of the next frame will be the next event, and the next frame will start.

There may be examples in which the VM 114 operates without an OS 124, so-called bare metal, where there may be only foreground tasks, and a background activity that runs all the time when the foreground is not executing. In these examples, there may not be an idle state of the virtual processor 118. But just because the background is running all the time does not imply that it is always doing useful work. In some examples, then, approaches such as the aforementioned third example approach may be used to limit the background processing. In this regard, a processing window may still be created before the start of the next frame, but instead of looking for an idle state of the virtual processor, the current point in time after all foreground tasks 206 have been executed may be detected. In another example, the first example approach may also work without an OS, if the background activity did nothing useful and really did not have to run. Again, an end of foreground task execution may be used instead of an idle virtual processor.

Even further, it may be possible to advance apparent time with a virtualization platform 116 without processor emulation. This may allow for the removal of idle time in a manner similar to that in a virtualization with emulation platform. Although example implementations may be particularly useful in removing idle time to speed up emulation of the processor of the target hardware platform because it may be slower than non-emulated virtualization, benefits may still be achieved by speeding up performance in non-emulated virtualization contexts. In some examples, the instruction execution may not be visible on a non-emulated virtualization platform, so events other than instruction execution may be used to detect the idle time. Some other events that may be used to detect idle time include, for example, hardware accesses, memory accesses, context switches or the like. It may also be possible to advance wall-clock time on the timer 108 of the host hardware platform 102 by introducing a virtualization layer 112 that may intercept hardware timer setup and manipulate hardware timers to advance them at different rates then they were actually programmed.

Figure 3:
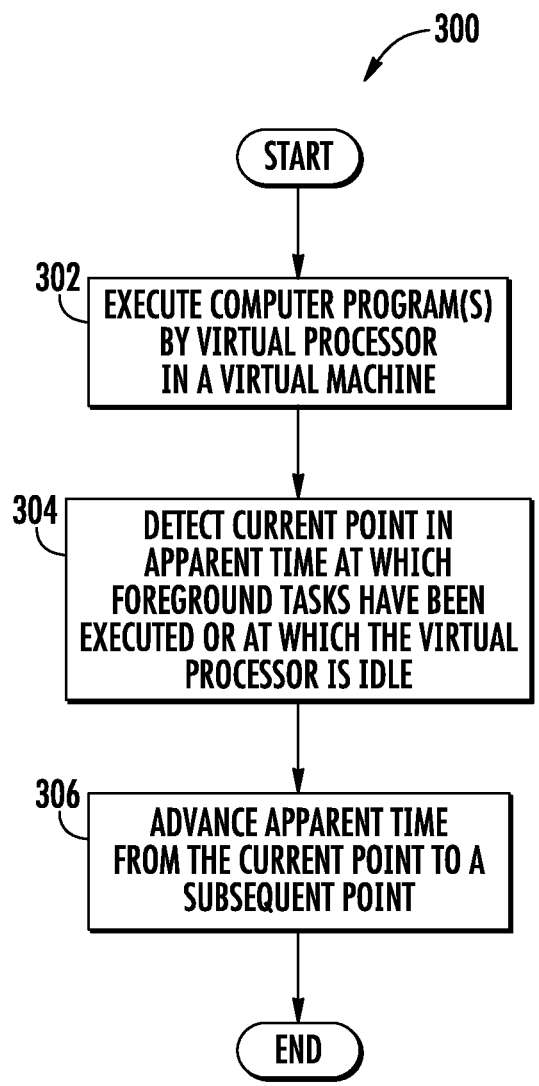
FIG. 3 illustrates a flowchart including various steps in a method of providing virtualization services, according to an example implementation of the present disclosure.

FIG. 3 illustrates a method 300 of providing virtualization services according to example implementations of the present disclosure. As shown at block 302, the method may include executing one or more computer programs 122 by a virtual processor 118 in a VM 114. The computer programs may be executed as tasks scheduled for execution at respective points in apparent time tracked by an apparent-time reference such as a virtual timer 120. In some examples, the tasks may be executed during a cycle 200 divided into a plurality of frames 202 in one or more of which each of at least some of the tasks is scheduled for execution (foreground tasks 206). The frames may have boundaries 204 defined at respective points in an apparent time tracked by a virtual timer 120. During execution of the computer programs, the method may include detecting a current point in apparent time (e.g., during any particular frame) at which all tasks scheduled for repeated execution at a given frequency have been executed, or at which the virtual processor is idle, as shown in block 304. And in response, the method may include advancing the apparent time from the current point to a subsequent point with a frequency greater than that with which the apparent time is tracked by the apparent-time reference (e.g., virtual timer), as shown in block 306.

Figure 4:
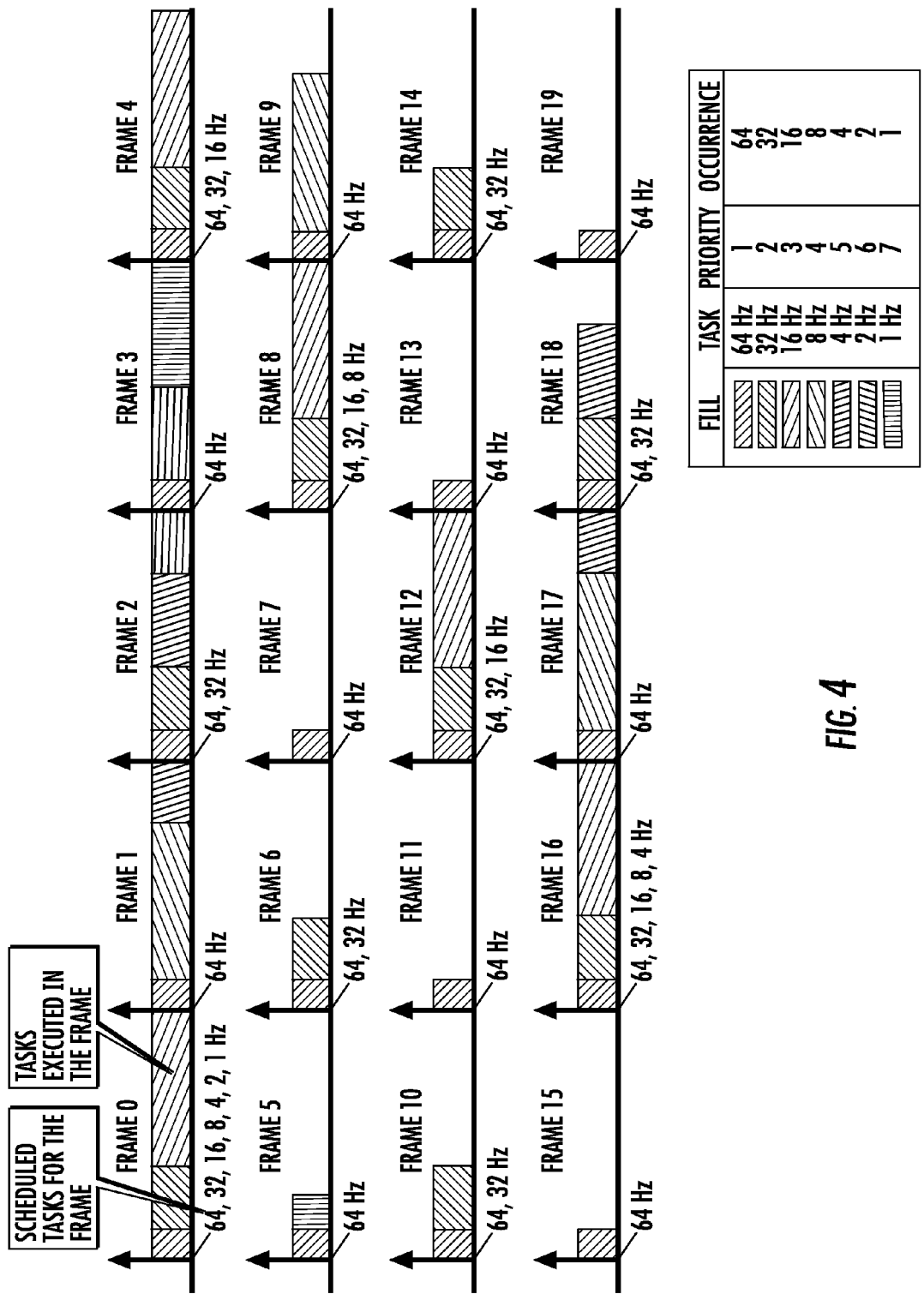
FIGS. 4, 5 and 6 illustrate computer programs including tasks that may be executed, and how idle time may be removed during their execution, according to an example implementation of the present disclosure.
Figure 5:
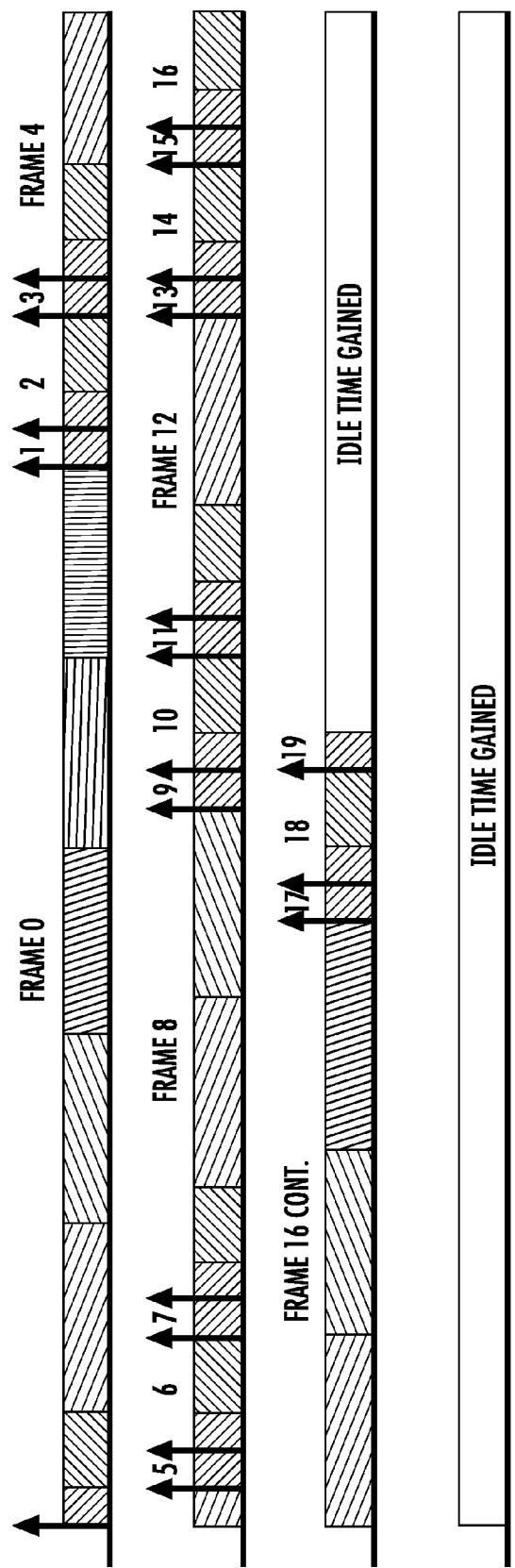
Figure 6:
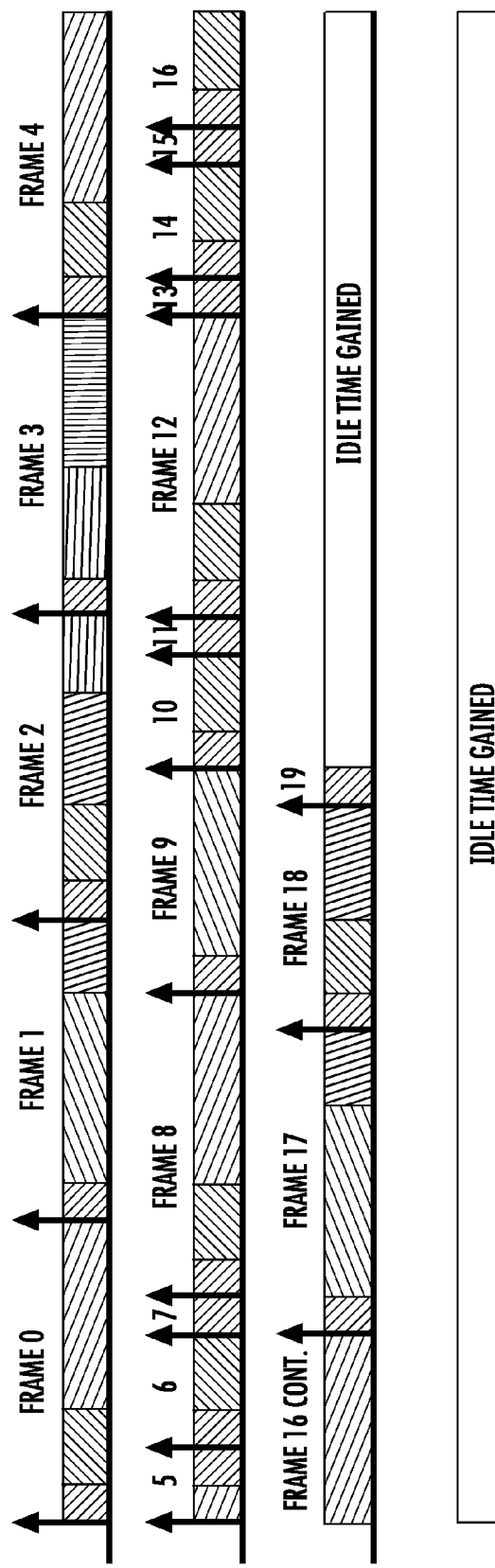

To further illustrate how removal of certain time (background or idle) according to example implementations may provide performance gains for a VM 114, consider the example shown in FIGS. 4, 5 and 6. In this example, the computer programs 122 executed in the VM may include seven tasks scheduled to execute a various rates. These tasks in order of scheduling priority may include the following: Task64 Hz (highest priority), Task32 Hz, Task16 Hz, Task8 Hz, Task4 Hz, Task2 Hz and Task1 Hz (lowest priority). In this design, the priorities and OS task preemption may be used to achieve the desired sequence of activities for the programs, and a timer interrupt may start each frame at a 64 Hz rate.

In this example, all tasks may be scheduled to execute in the first frame (frame 0). Through task preemption, each frame may include the highest-priority task (Task64 Hz), alone or in combination with lower-priority foreground tasks and/or background tasks. FIG. 4 illustrates execution of the tasks on the target hardware platform, which may be virtualized by the virtualization platform 116 on the VM 114. FIGS. 5 and 6 illustrate approaches to improve the performance of the VM through the removal of idle time, according to example implementations. For purposes of this example, the frame background may be considered to just include an idle virtual processor 118, without other background processing. All of this background time may therefore be gained by advancing apparent time in accordance with example implementations. Performance improvements for the VM 114 may be achieved by removing idle time or sliding the frames together in terms of wall-clock time. The figures illustrate example task execution times for the respective tasks.

FIG. 5 illustrates the removal of idle time during execution of the computer programs 122 without adhering to the aforementioned task preemption, according to one example. Here, the idle time in the system may be removed for an improvement in performance of the VM 114. According to this example approach, every time a frame enters an idle state, the next virtual timer interrupt may be signaled. This may cause heavily utilized frames (e.g., frames 0, 8, 16) to take much longer to execute in terms of wall-clock and apparent time. The order of execution may therefore not be representative of the actual target hardware platform order of execution, which may be of consequence in instances in which the system design is sensitive to the order of execution of the tasks.

FIG. 6 illustrates the removal of idle time during execution of the computer programs 122 while adhering to the aforementioned task preemption, according to another example. In this approach, beginning idle time in a frame may not itself be used to trigger the start of the next frame, but may instead be used to break out of the frame. In fully-subscribed frames such as frame 0, there may be no idle time, and the execution of the frame may be the same as on the target hardware platform. In undersubscribed frames such as frame 5, there may be idle time, which may cause the apparent time to advance forward and skip over the emulation of idle instructions. This approach may allow for the order of execution to be the same as the target hardware platform.

The amount of improvement of the VM 114 through the removal of idle time may depend on the amount of idle time. For example, if a program 122 uses 50% of the available processing time, then removing the idle time may allow the program to execute twice as fast as on the target hardware platform. There may also be other factors that can contribute to how much of a performance improvement can be achieved. Still, the program's processing requirements on the target hardware platform may provide an approximate estimate of what may be achieved through the removal of idle time according to example implementations. In some applications, for example, a number of frame-based systems may include a contractual spare processing requirement, which may be 50%, and which may constitute idle time that may be removed according to some example implementations.

As indicated above, program code instructions may be stored in memory 106 (computer-readable storage medium), and executed by a processor 104, to implement functions of the computer system 100 described herein. As will be appreciated, any suitable program code instructions may be loaded onto the computer system from memory to produce a particular machine, such that the particular machine becomes a means for implementing the functions specified herein. These program code instructions may also be stored in memory that can direct the computer system or processor to function in a particular manner to thereby generate a particular machine or particular article of manufacture. The instructions stored in memory may produce an article of manufacture, where the article of manufacture becomes a means for implementing functions described herein. The program code instructions may be retrieved from memory and loaded into the computer system or processor to configure the computer system or processor to execute operations to be performed on or by the computer system or processor.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer system 100 or processor 104 provide operations for implementing functions described herein.

Execution of instructions by the processor 104, or storage of instructions in memory 106, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer system comprising a processor and a memory storing computer-readable program code portions that, in response to execution by the processor, cause the computer system to at least:
execute one or more computer programs by a virtual processor in a virtual machine, the computer programs being executed as tasks scheduled for execution at respective points in an apparent time tracked by an apparent-time reference; and during execution of the computer programs:
detect a current paint, in apparent time at which all tasks scheduled for repeated execution at a given frequency have been executed, or at which the virtual processor is idle and in response thereto,
advance the apparent time from the current point to a subsequent point with a frequency greater than that with which the apparent time is tracked by the apparent-time reference,
wherein the computer programs are executed as tasks during a cycle divided into a plurality of frames in one or more of which each of at least some of the tasks is scheduled for execution, and the apparent-time reference comprises a virtual timer configured to track the frames having boundaries defined at respective points in the apparent time,
wherein the computer system being, caused to detect the current point in apparent time includes being caused to detect the current point in apparent time during any particular frame at which the virtual processor is idle, and
wherein the computer system being caused to advance the apparent time includes being caused to advance the apparent time to the subsequent point in apparent time that defines the boundary of a frame immediately following the particular frame in the cycle, such that idle time in the system may be removed to provide an improvement in performance of the virtual processor.

2. The computer system of claim wherein the virtual machine is defined to provide a virtualization platform for virtualization of a target hardware platform including a processor of a type different from the processor of the computer system, the virtualization platform including the virtual processor configured to execute the computer programs through emulation of the processor of the target hardware platform.

3. The computer system of claim 1, wherein the computer system being caused to detect the current point includes being caused to detect the current point in apparent time at which the virtual processor is idle, and
wherein the computer system being caused to advance the apparent time includes being, caused to incrementally advance the apparent time in portions of a duration of each of the frames until the earlier of the subsequent point in apparent time that defines the boundary of a frame immediately following the particular frame in the cycle, or the subsequent point in apparent time at which a task is scheduled for execution.

4. The computer system of claim 1, wherein the subsequent point in apparent time is the point in apparent time that defines the boundary of a frame immediately following the particular frame in the cycle, less a processing, window of a given duration of the particular frame, and wherein during execution of the computer programs, the computer system is further caused to:
detect a current point in apparent time during the processing window at which all tasks scheduled for repeated execution at a given frequency have been executed, or at which the virtual processor is idle; and in response thereto,
advance the apparent time from the current point to the subsequent point in apparent time that defines the boundary of the frame immediately following the particular frame in the cycle.

5. The computer system claim 1, wherein the apparent-time reference is configured to virtualize a corresponding time reference of a target hardware platform, and the tasks are generated in response to events known to occur at respective points in apparent time, the events including events that occur at the respective points in apparent time at which the boundaries of the frames are defined,
wherein the computer system being caused to detect the current point includes being caused to detect the current point in apparent time at which the virtual processor is idle, and
wherein the computer system being caused to advance the apparent time includes being caused to advance the apparent time to a next subsequent point in apparent time at which an event of the events is known to occur.

6. The computer system of claim 1, wherein the computer system is caused to detect the current point in apparent time, and advance the apparent time fro the current point, at or within the virtual machine.

7. A method of providing virtualization services, the method comprising:
executing one or MOM computer programs by a virtual processor in a virtual machine, the computer programs being executed as tasks scheduled for execution at respective points in an apparent time tracked by an apparent-time reference; and during execution of the computer programs;
detecting a current point in apparent time at which all tasks scheduled for repeated execution at a given frequency have been executed, or at which the virtual processor is idle; and
in response thereto, advancing the apparent time from the current point to a subsequent point with a frequency greater than that with which the apparent time is tracked by the apparent-time reference,
wherein the computer programs are executed as tasks during a cycle divided into t pluarlity of frames in one or more of which each of at least some of the tasks is scheduled for execution, and the a rent-time reference comprise a virtual timer configure to track the flames having boundaries defined at respective points in the apparent time,
wherein detecting the current point in apparent time includes detecting the current point in apparent time during any particular frame at which the virtual processor is idle,
wherein advancing the apparent time includes advancing the apparent time to the subsequent point in apparent time that defines the boundary of a frame immediately following the particular frame in the cycle, such that de time may he removed to provide an improvement in performance of the virtual processor, and wherein the virtualization services are provided by computer system comprising a processor and a memory storing computer-readable program code portions that, in response to execution by the processor, cause the computer system to execute the computer programs, detect the current point in apparent time and advance the apparent time from the current point.

8. The method of claim 7, wherein detecting the current point includes detecting the current point in apparent time at which the virtual processor is idle, and wherein advancing the apparent time includes incrementally advancing the apparent time in portions of a duration of each of the frames until the earlier of the subsequent point in apparent time that defines the boundary of a frame immediately following the particular frame in the cycle, or the subsequent point in apparent time at which a task is scheduled for execution.

9. The method of claim 7, wherein the subsequent point in apparent time is the point in apparent time that defines the boundary of a frame immediately following the particular frame in the cycle, less a processing window of a given duration of the panieular frame.

10. The method of claim 9, wherein during execution of the computer programs, the method further includes:

detecting a current point in apparent time during the processing window at which all tasks scheduled for repeated execution at a given frequency have been executed, or at which the virtual processor is idle; and in response thereto, advancing the apparent time from the current point to the subsequent point in apparent time that defines the boundary of the frame immediately following the particular frame in the cycle.

11. The method of claim 7, wherein the apparent-time reference is configured to virtualize a corresponding time reference of a target hardware platform, and the tasks are generated in response to events known to occur at respective points in apparent time, the events including events that occur at the respective points in apparent time at which the boundaries of the frames are defined, wherein detecting the current point includes detecting the current point in apparent time at which the virtual processor is idle, and wherein advancing the apparent time includes advancing the apparent time to a next subsequent point in apparent time at which an event of the events is known to occur.

12. A computer-readable storage medium having computer-readable program code portions stored therein that, in response to execution by a processor, cause a computer system to at least:

execute one or more computer programs by a virtual processor in a virtual machine, the computer programs being executed as tasks scheduled for execution at respective points in an apparent time tracked by an apparent-time reference; and during execution of the computer programs;

detect a current point in apparent time at which all tasks scheduled for repeated execution at a given frequency have been executed, or at which the virtual processor is idle; and in response thereto, advance the apparent time from the current point to a subsequent point with it frequency greater than that with which the apparent time is tracked by the apparent-time reference, wherein the computer programs are executed as tasks during a cycle divided into a plurality of frames in one or more of which each of at least some of the tasks is scheduled for execution. and the apparent-time re retire comprises a virtual timer configured to track the frames having boundaries defined at respective points in the apparent time, wherein the computer system being, caused to detect the current point in apparent time includes being caused to detect the current point in apparent time during any particular frame at which the virtual processor is idle, and wherein the computer system being caused to advance the apparent time includes being caused to advance the apparent time to the subsequent point in apparent time that defines the boundary of a frame immediately following the particular frame in the cycle, such that idle time in the system max be removed to provide an improvement in performance of the virtual processor.

13. The computer-readable storage medium of claim 12, wherein the computer system being caused to detect the current point includes being caused to detect the current point in apparent time at which the virtual processor is idle, and wherein the computer system being caused to advance the apparent time includes being caused to incrementally advance the apparent time in portions of a duration of each of the frames until the earlier of the subsequent point in apparent time that defines the boundary of a frame immediately following the particular frame in the cycle, or the subsequent point in apparent time at which a task is scheduled for execution.

14. The computer-readable storage medium of claim 12, wherein the subsequent point in apparent time is the point in apparent time that defines the boundary of a frame immediately following the particular frame in the cycle, less a processing window of a given duration of the particular frame, and wherein during execution of the computer programs, the computer system is further caused to:

detect a current paint in apparent time during the processing window at which all tasks scheduled for repeated execution at a given frequency have been executed, or at which the virtual processor is idle; and in response thereto, advance the apparent time from the current point to the subsequent point in apparent time that defines the boundary of the frame immediately following the particular frame in the cycle.

15. The computer-readable storage medium of claim 12, wherein the apparent-time reference is configured to virtualize a corresponding, time reference of a target hardware platform, and the tasks are generated in response to events known to occur at respective paints in apparent time, the events including events that occur at the respective points in apparent time at which the boundaries of the frames are defined, wherein the computer system being caused to detect the current point includes being caused to detect the current point in apparent time at which the virtual processor is idle, and wherein the computer system being caused to advance the apparent time includes being caused to advance the apparent time to a next subsequent point in apparent time at which an event of the events is known to occur.

* * * * *